United States Patent [19]
Coronado et al.

[11] Patent Number: 5,686,031
[45] Date of Patent: Nov. 11, 1997

[54] METHOD FOR RAPIDLY PRODUCING MICROPOROUS AND MESOPOROUS MATERIALS

[75] Inventors: Paul R. Coronado; John F. Poco, both of Livermore; Lawrence W. Hrubesh, Pleasanton; Robert W. Hopper, Danville, all of Calif.

[73] Assignee: Regents of the University of California, Oakland, Calif.

[21] Appl. No.: 368,823

[22] Filed: Jan. 5, 1995

[51] Int. Cl.$^6$ ................................................. B29C 65/00
[52] U.S. Cl. .......................... 264/40.1; 264/41; 264/42; 264/49; 264/50
[58] Field of Search ........................ 264/41, 42, 49, 264/50, 40.1; 501/12, 80

[56] References Cited

U.S. PATENT DOCUMENTS

| | | | |
|---|---|---|---|
| 4,327,065 | 4/1982 | von Dardel et al. | 423/338 |
| 4,402,927 | 9/1983 | von Dardel et al. | 423/335 |
| 4,432,956 | 2/1984 | Zarzycki et al. | 423/338 |
| 4,667,417 | 5/1987 | Graser et al. | 34/9 |
| 4,849,378 | 7/1989 | Hench et al. | 501/12 |
| 4,851,373 | 7/1989 | Hench et al. | 501/12 |
| 4,954,327 | 9/1990 | Blount | 423/338 |
| 5,275,796 | 1/1994 | Tillotson et al. | 423/338 |

OTHER PUBLICATIONS

Deshpande et al., Pore Structure Evolution Of Silica Gel During Aging/Drying: Effect Of Surface Tension, 1992, pp. 553–558, Mat. Res. Soc. Symp. Proc. vol. 271.
Wallace et al., The Processing And Characterization Of DCCA Modified Gel–Derived Silica, 1984, pp. 47–52, Mat. Res. Soc. Symp. Proc. vol. 32.
Klvana et al., A New Method Of Preparation Of Aerogel–Like Materials Using A Freeze–Drying Process, 1989, pp. C4–29—C4–32, Revue De Physique Appliquee.
Degn Egeberg et al., Freeze Drying Of Silica Gels Prepared From Siliciumethoxid, 1989, pp. C4–23—C4–28, Revue De Physique Appliquee.
Pajonk, Drying Methods Preserving The Textural Properties Of Gels, 1989, pp. C4–13—C4–22, Revue De Physique Appliquee.
Scherer, Stress Development During Supercritical Drying, 1992, pp. 33–40, Journal Of Non–Crystalline Solids.
Woignier et al., Physicochemical Transformation Of Silica Gels During Hypercritical Drying, 1992, pp. 25–32, Journal Of Non–Crystalline Solids.
Brinker et al., Sol–Gel Science, pp. 408–451, The Physics And Chemistry Of Sol–Gel Processing, Chaper 7.
Brinker et al., Sol–Gel Science, pp. 408–451, The Physics And Chemistry Of Sol–Gel Processing, Chapter 8.
Laudise et al., Supercritical Drying Of Gels, 1986, pp. 155–164, Journal Of Non–Crystalline Solids.

*Primary Examiner*—Christopher A. Fiorilla
*Attorney, Agent, or Firm*—Daryl S. Grzybicki; Henry P. Sartorio

[57] ABSTRACT

An improved, rapid process is provided for making microporous and mesoporous materials, including aerogels and pre-ceramics. A gel or gel precursor is confined in a sealed vessel to prevent structural expansion of the gel during the heating process. This confinement allows the gelation and drying processes to be greatly accelerated, and significantly reduces the time required to produce a dried aerogel compared to conventional methods. Drying may be performed either by subcritical drying with a pressurized fluid to expel the liquid from the gel pores or by supercritical drying. The rates of heating and decompression are significantly higher than for conventional methods.

20 Claims, 2 Drawing Sheets

METHOD FOR RAPIDLY PRODUCING MICROPOROUS AND MESOPOROUS MATERIALS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a process for rapidly producing open-pore microporous and mesoporous materials, such as aerogels and pre-ceramics.

2. Description of Related Art

In the manufacture of microporous and mesoporous solids with open and connected pores, such as polymer foams, pre-ceramics, porous glasses, aerogels, and xerogels, the porous material is dried by removing the liquid from a two-phase liquid-solid network. The network of one type of microporous material, aerogel, is typically produced in a two-step process.

In the first step, a metal alkoxide solution and other liquid reactants are mixed thoroughly, and the mixture is poured into molds. The reactions continue within the molds, and particles called "sols" are formed within the mixture. The sols link until a connected solid structure (a gel) forms, which is surrounded by a liquid by-product of the same reactions. The two-phase gel consists of a porous, connected solid phase dispersed in a liquid. In the second step, after gelation is complete, and often after additional time for aging, the gel is dried by removing the liquid from the pores so that the porosity of the wet gel changes minimally. [See Tillotson et al., U.S. Pat. No. 5,275,796 for a description of making low density aerogels.] Depending on the concentration of metal alkoxide in the mixture, the gelling step can occur in minutes or hours, but typically takes many days, weeks, or even months for extremely dilute mixtures. The long gelation time required for low density aerogels limits large scale production of these materials, and improved processes are needed to increase the production rate.

Aerogels are characterized by nanometer size pores and particles, where size depends on the density (porosity) and the chemistry of formation. The aerogel particles range in size from less than two nanometers to 20 nanometers, and the average pore size is typically less than 80 nanometers. In all cases, the dimensions of the pores and particles in aerogels are less than the wavelengths of visible light, resulting in transparency and other exceptional properties.

The small size of the pores results in useful physical properties, but also complicates the drying of the wet gels to aerogels. The pore sizes in the material are so small that the flow of liquid to the surface from within the gel is limited. In evaporative drying, the surface tension of the liquid in the small pores creates extremely high forces as the material dries, which tends to collapse the weak solid structure of the gel. The gels are typically not strong enough to resist this shrinkage during evaporation. The forces increase tremendously when the pores become less than one micrometer in diameter. For porous solids like aerogels and xerogels, whose average pore size is much less than one micron, evaporative drying is normally done extremely slowly to minimize cracking and shrinking. These long drying times also limit large scale production.

Other special techniques for drying gels to aerogels involve one of two basic ideas. One idea is to modify the surface energy of the gel chemically. The surface tension forces are reduced below the basic strength of the gel, so the liquid is removed with minimal stress to the gel. These methods require hours or even tens of hours to complete the entire process of making and drying the gels. [See S. Wallace and L. L. Hench, "The processing and characterization of DCCA modified gel derived silica," *Better Ceramics Through Chemistry II*, eds. C. J. Brinker, D. E. Clark, D. R. Ulrich, (Materials Research Society, Vol. 32, North Holland, N.Y., 1985) p. 47; R. Deshpande, D. M. Smith and C. J. Brinker, in *Better Ceramics Through Chemistry V*, eds., M. J. Hampden-Smith, W. G. Klemperer, C. J. Brinker, (Materials Research Society, Pittsburgh, Pa., 1992) p. 553.

The other idea is to change the temperature (or the pressure) of the gel so that the pore liquid is transformed to another state of matter (i.e., solid, gas, or supercritical fluid). The new state has reduced interfacial surface tension with the gel and can be removed from the gel without excessive shrinkage, either by evacuating or purging with a gas.

The conventional methods are freeze-drying, where the liquid is cooled to a solid and sublimed, and supercritical drying, in which the liquid is heated under pressure to a supercritical fluid. Unfortunately, both of these methods are time-consuming, energy-intensive, and require additional materials processing. They are inherently batch processes and not amenable to rapid processing for mass production.

See G. M. Pajonk, "Drying Methods Preserving the Textural Properties of Gels", p. 13; E. Degn Egeberg and J. Engell, "Freeze Drying of Silica Gels Prepared from Siliciumethoxid", p. 23; D. Klvana, J. Chaouki, M. Repellin-Lacroix, and G. M. Pajonk, "A New Method of Preparation of Aerogel-Like Materials Using a Freeze-Drying Process," p. 29, all in *Proc. of the 2nd International Symposium on Aerogels ISA2*, eds. R. Vacher, J. Phalippou, J. Pelous, and T. Woignier, (Revue De Physique Appliqueé, Colloque C4, No. 4, April 1989).

See S. S. Kistler, Nature 127 (1931) 741 and U.S. Pat. No. 2,249,767; Teichner et al., U.S. Pat. No. 3,672,833; von Dardel et al., U.S. Pat. No. 4,402,927; Zarzycki, U.S. Pat. No. 4,432,956; Van Lierop et al., U.S. Pat. No. 4,806,328; Tewari et al., U.S. Pat. No. 4,610,863.

In supercritical drying, the gel is placed in an autoclave where the temperature and pressure are increased above the supercritical point of the fluid in the pores. This technique has a serious drawback. The gel may crack during heating because the liquid solvent within the gel expands faster than it can flow through the very fine pores, thus causing tension and internal stresses in the gel. To avoid cracking, the stresses cannot exceed the basic strength of the gel (i.e., its modulus of rupture). The rate of heating the gel must be slowed so that the rate of expansion of the liquid solvent does not stress the gel beyond its modulus of rupture. This limitation has been studied theoretically by Scherer.

See G. W. Scherer, "Stress in Aerogel During Depressurization of Autoclave: I. Theory, *J. Sol-Gel Science and Technology* 3 (1994) 127; T. Woignier, G. W. Scherer, and A. Alaoui, "Stress in Aerogel During Depressurization of Autoclave II. Silica Gels, *J. Sol-Gel Science and Technology* 3 (1994) 141; G. W. Scherer, "Stress development during supercritical drying," *J. Non-Cryst. Solids* 145 (1992) 33. The intent of the theoretical and experimental work reported by Scherer is to find the optimum time profile for the supercritical drying process so that processing time can be minimized.

The complexity and cost of equipment, and the excessive time and labor required for drying, limits the commercialization of microporous materials, especially aerogels. Faster, simpler, and less expensive methods are needed to produce and dry the gels. The present invention increases the rate of liquid removal from microporous materials, while also reducing the net forces that tend to shrink or destroy the solid network. In addition, the waiting time for gelation to occur is essentially eliminated. The present method allows rapid, semi-continuous processing of ultra fine pore materials for mass production, thereby making the manufacture of these types of materials cost-effective.

SUMMARY OF THE INVENTION

This invention is a method of rapidly producing microporous and mesoporous materials, while simultaneously preventing shrinkage and cracking. The present method minimizes the time of gelation and drying by physically confining the gel during these processes. The stresses that limit expansion rates in the unconfined processes are reduced, and the rate of heating and subsequent expulsion of the liquid from the gel can be greatly accelerated.

Microporous and mesoporous materials may include aerogels, xerogels, cryogels, polymer foams, pre-ceramics, and porous glasses. Microporous and mesoporous materials are commonly formed by gelling a solution and then drying the gel. In this invention, the precursor solution is confined within a mold or pressure vessel, and gelation and drying occur in one step at elevated temperature and pressure. Gelation is accelerated by the high temperature in the autoclave, and occurs during the ramp-up time to reach the desired temperature and pressure. By gelling and then drying the gel in essentially one step, the processing time for microporous materials is significantly reduced compared to conventional methods.

Several ideas are combined in the present method for rapidly gelling and drying microporous materials, such as aerogels. The fundamental concept is to confine the gel during gel formation and drying. Gelation in the mold or pressure vessel during heating eliminates both waiting for the gel to form and the delicate transfer of a wet, fragile gel into the pressure vessel. When the gel is confined, neither the expansion of the liquid during heating or the expansion of a supercritical fluid during decompression will cause significant strains in the gel, thus essentially eliminating stress in the gel. The gel does not crack even when the rate of heating and decompression is increased. Thus, the gel is dried in a much shorter time than would occur for unconfined wet gels, leading to a rapid cycle time for material processing.

When the gel is confined and cannot deform under the influence of pressure gradients, the internal gel liquid is removed by supercritical or subcritical drying. In supercritical drying, the internal gel liquid is heated at least to the critical point, and the super fluid is removed from the vessel. In subcritical drying, the gel liquid can be expelled from the gel structure by displacing it under pressure with another fluid—i.e., a liquid, a supercritical fluid, or a gas.

If a gas is used to displace the pore liquid, then drying is complete when the last residue of liquid has been removed from the gel. If a liquid is used, and the displacing liquid has a lower critical point than the solvent it is replacing, then the displacing liquid can subsequently be converted to a supercritical fluid and removed from the gel under its own pressure. If the replacing fluid is already in its critical state, then the drying is essentially complete when the displacing fluid has replaced the last of the liquid solvent.

The present invention is applicable to organic and inorganic aerogels, and will eliminate the time-consuming process conventionally required to exchange the pore fluid with carbon dioxide, which is commonly used for supercritical drying. The improved method can be used to semi-continuously process microporous materials, thus providing considerable savings in time, energy, and cost for many microporous materials. For aerogels and xerogels, this method could reduce the production time by an order of magnitude, and thus substantially reduce material production costs.

DETAILED DESCRIPTION OF THE INVENTION

The invention is a method that allows the rapid production of microporous and mesoporous materials having continuous porosity. Microporous materials have a predominance of pores with an average size less than 0.05 micrometers. Mesoporous materials have a predominance of pores with an average size less than one micrometer. The porous materials may include aerogels, xerogels, cryogels, polymer foams, pre-ceramics, porous glasses, and biofoam. Most porous materials of these types have a distribution of both micro- and mesopores, but aerogels are predominantly microporous.

For those materials that can be made from gels, the present process eliminates the separate step of forming the gel before placing it in a vessel to be dried, and does not require handling of the wet, delicate gel. The gel is physically confined during gelation and drying, which substantially reduces the amount of time for the overall process relative to other methods. This method is particularly advantageous for attaining high production rates of aerogels.

Figure 1:
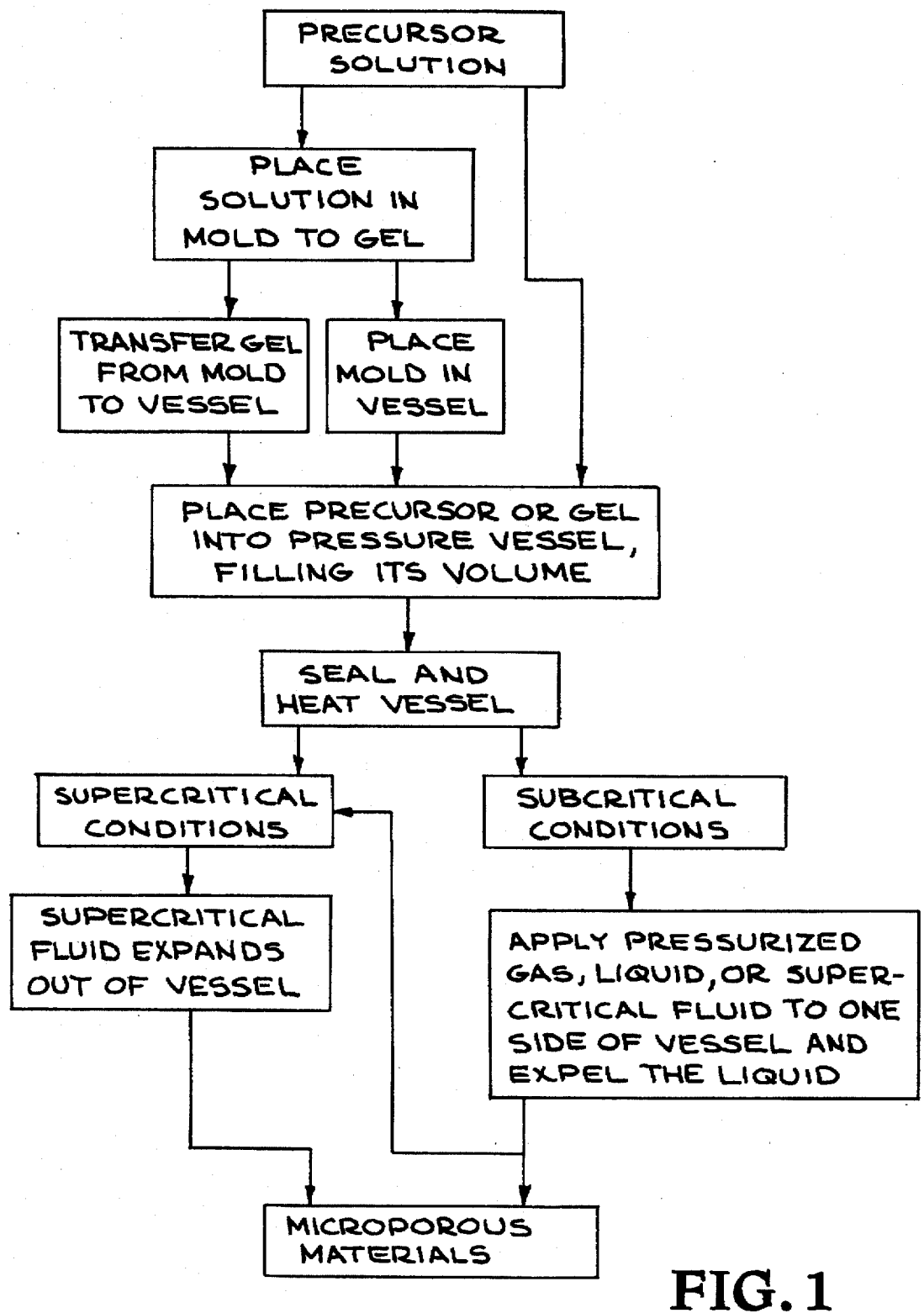
FIG. 1 is a flowchart of the present method.
Figure 2:
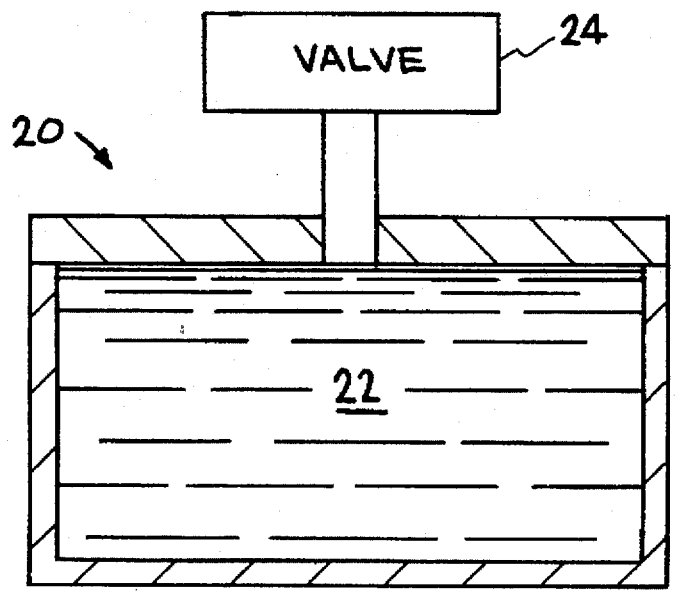
FIG. 2 shows an apparatus for processing aerogels.

FIG. 1 is a flowchart of the present process, including some variations. The process begins with a precursor solution that will form a gel. For purposes of the present description, a gel is defined as a solid-liquid porous structure. The precursor solutions may consist of reactants for organic or inorganic aerogels, and may form alcogels or hydrogels. [A method of making precursor solutions for aerogels is described in U.S. Pat. No. 5,275,796]. The solution may be poured into a pressure vessel directly, or may be gelled outside the vessel in a mold. To minimize processing and handling time, it is preferable to pour the solution directly in the vessel. If the gel is formed outside the vessel, the mold may be placed in the vessel directly, or the pre-formed gel may be transferred from the mold to the vessel. FIG. 2 is a schematic of a pressure vessel 20.

The precursor or gel 22, once confined by the walls of the pressure vessel (or alternatively the walls of the mold), must substantially fill the volume of the vessel. The vessel is sealed and heated, and as heating proceeds, the pressure in the vessel increases. Additional pressure may be applied in the vessel if necessary to reach the desired pressure. As shown in FIG. 2, the vessel includes a pressure valve 24, and may include other means for fluid to escape during heating. The pressure may be released from the vessel through small openings, or through a frit or other hard porous material.

During heating, the gel may expand slightly, forming a tight seal against the walls of the vessel. It is critical that the vessel be filled so that cracking will not occur upon limited expansion of the gel during heating. Any method of rapidly heating the vessel may be used, e.g., conduction, induction, or radiation. The vessel may be made of any material (metal, non-metal) that can withstand the process conditions.

The vessel is rapidly heated and pressurized to achieve either supercritical or subcritical conditions for the liquid solvent in the gel. FIG. 1 shows the two pathways for drying: supercritical drying and subcritical drying. A substantially monolithic gel can be formed during the process of heating the precursor solution confined in the vessel to the desired supercritical or sub critical point. Gelling the solution in the vessel (in situ) during heating is preferable to save time and handling.

By confining the gel in a high pressure vessel during heating, the pore liquid can expand and escape the gel and the vessel, virtually without stressing the gel. The confinement of the gel also limits its own thermal expansion and thus reduces the internal stress, while the liquid escapes the gel through an opening in the vessel provided for that purpose. Due to the minimal stress in the confined gel, the rate of heating can be increased, and the time to reach the desired temperature is minimized. The rate of heating may be as rapid as desired, and is not limited by the strength of the gel.

Supercritical Drying

In supercritical drying, the solvent-filled gel is heated and pressurized in the pressure vessel until the liquid phase of the solvent transforms to a supercritical fluid. The gel may be formed during the supercritical drying step within the autoclave vessel as a precursor solution is heated under pressure. The conditions of increased temperature and pressure that are applied to the solution induce and accelerate the reactions leading to gelation, so that a gel is formed in situ in a fraction of the time that is needed at standard temperature and pressure conditions. This method thereby eliminates the processing time that is normally needed to form and age the gel to insure that the gel is structurally intact and can withstand the rigors of handling.

Gels often crack during the conventional supercritical drying process because the liquid solvent within the gel expands faster than the solvent can flow through the very fine pores, thus causing tension and internal stresses in the gel. To avoid cracking, the rate of heating the gel is typically slowed so that the rate of expansion of the liquid solvent does not stress the gel beyond its modulus of rupture. Thus, for physically large gels, the conventional process requires hours of heating time to heat the gel to the critical temperature.

But by confining the gel in a high pressure vessel or mold during heating, the liquid is expelled from the gel without stress. The gel is not allowed to expand significantly, and the liquid escapes through an opening in the vessel. As a result of lack of stress in the confined gel, the rate of heating can be increased dramatically, and the time to reach supercritical temperature is minimized (e.g., with radio frequency heating, only minutes would be required). The rate of liquid expulsion from the gel is limited only by the permeability of the gel.

After the supercritical temperature and pressure are reached, the supercritical fluid is rapidly released from the gel. The vapor remaining in the pores of the gel can be evacuated or purged (replaced) with a gas, such as air. This exchange can occur as fast as the permeability of the gel allows transport, which is a function of the pore size and the physical size of the gel, as well as the viscosity of the remaining vapor. For thin samples, this exchange time may be only minutes. The dried material is removed from the vessel or mold after sufficient cooling. The microporous or mesoporous material can take many forms: monoliths, powders, cracked gels, granules, and pellets. Supercritical drying is the preferred method for producing inorganic aerogels. The supercritical fluid may be any fluid, such as, but not limited to, the following: water, carbon dioxide, nitrous oxide, propane, freons, alcohols, ketones, ethers, amines, and nitrated hydrocarbons.

In practice, the entire process can be completed in minutes. The decompression rate has been demonstrated at 200 times the conventional rate, and is typically performed at least 20 times the usual rate (i.e., about 5 psi per minute). In contrast, the conventional supercritical drying process is performed very slowly, so that the gel matrix is not thermally or mechanically stressed beyond its rupture point, causing cracks. The entire time to dry gels by conventional means, including heating, decompression, and cooling, depends on the size, but typically requires more than ten hours.

The present process of drying microporous or mesoporous gels without structural collapse by rapidly heating and decompressing the fluid in the gel without destroying structural integrity is novel in the art. This invention accomplishes the rapid heating and decompression because the gel is confined within a vessel so that its structure cannot move or deform under the influence of flowing fluids.

Applying Pressurized Fluids

As shown in FIG. 1, an alternative method of drying the confined liquid-filled gel is to heat the gel to subcritical conditions, which allows the gel to expand slightly to form a seal with the vessel, and then purge the liquid from the pores. The pressure of a pressurizing agent, either a pressurized gas, a liquid, or a supercritical fluid, is applied and maintained on one or more sides of the gel. The pressure must be sufficient to at least partially offset the capillary forces that tend to collapse the solid network of the gel. At least one surface of the gel is exposed to a lower pressure, so that a pressure difference exists through the gel's volume. The pressure difference forces the liquid to be expelled from the gel, and the liquid is then removed from the surface of the gel exposed to the lower pressure.

The rate at which the liquid is expelled depends on the pressure differential across the material, but is ultimately limited by the permeability of the material. For porous gels, the flow rate of the liquid out of the pores depends on its viscosity and on the permeability of the microporous network. In all cases, the existence of a sufficiently high, sustained pressure difference across the sample causes the liquid to be expelled from the solid network at its maximum rate.

When gas is used as the pressurizing agent, the gas enters the pores of the gel at the high pressure surface, and a meniscus forms at the gas-liquid interface within the pores. The flow rates through the pores tend to equalize so that the forces at the meniscus of each pore are nearly balanced by those in the adjacent pore. The meniscus indicates a net force that tends to pull the pore walls together. This force must be minimized to limit the drying stresses and to prevent crack formation and structural collapse. When a supercritical fluid is the pressurizing agent, the superfluid-liquid interface has a reduced meniscus due to the liquid-like nature of the supercritical fluid. In either case, the pressure is maintained until all the liquid is expelled, and the material is completely dry.

The pressure (P) of the applied gas that is needed to offset the capillary forces depends on the properties of the liquid. The capillary pressure for a liquid in a tube of radius r is $$P_c(\text{atm}) = -\frac{\gamma_{LV}}{r} \cos\phi.$$

$\gamma_{LV}$ is the surface tension of the liquid/vapor interface for the liquid, and $\phi$ is the wetting angle. For a tube with a radius of $10^{-6}$ cm, and using alcohol as the liquid ($\gamma_{LV}$=20 dyne/cm), the capillary pressure is approximately 20 atm. This pressure tends to collapse the tube walls and is the pressure of gas needed to offset the capillary forces.

The rate of flow of a fluid (liquid or gas) through a porous material in which there is viscous flow can be approximately from Darcy's law:

$$J(\text{cm/sec}) = \frac{K}{\eta_L} \overline{\nabla}P.$$

K and $\eta_L$ are the permeability and viscosity of the liquid, respectively, and $\overline{\nabla}P$ is the pressure gradient across the porous material. Thus, the flow of fluid can be increased by increasing the pressure across the material. The pressure can be provided by a gas or a supercritical fluid on one side of the liquid-filled porous material. The permeability, K, is very small if the pores are small, as is typical of aerogels. Since the ratio K/$\eta_L$ is typically at least two orders of magnitude larger for gases than for liquids, the ultimate flow rate is limited by K/$\eta_L$ for the liquid. As the porous material is dried, the thickness of the liquid layer is reduced so that $\overline{\nabla}P$ also increases.

Gas-assisted flow assures that the maximum flow rate is achieved for a given pressure gradient. As an example, the alcohol in a one centimeter thick alcohol-filled aerogel material can be removed in about 30 minutes when a gas pressure of 20 atm is used, if the measured values of K and $\eta_L$ are $15 \times 10^{-14}$ cm$^2$ and 0.6 centipoise, respectively. This removal time can be reduced if liquids having a lower viscosity are used.

The displacing gas may be of any composition, with air, helium, and carbon dioxide being preferred. The gas can be provided from a compressed source or compressed in situ. Once the liquid is displaced by the gas, the dried gel may be evacuated or purged with another gas, such as air, and then cooled for removal. A liquid having a viscosity less than or equal to that of the liquid being displaced is preferred as the replacing fluid in this invention. After the supercritical fluid replaces the pore liquid, the superfluid may be removed from the gel by purging, as described above.

If a pressurized liquid is used to expel the pore liquid, the replacing liquid is typically removed by supercritical drying, as described above. To confer an advantage to the process, the replacing liquid or supercritical fluid typically has a lower supercritical point than the original pore liquid. Liquids having relatively low critical temperature and pressure, such as carbon dioxide, nitrous oxide, air, helium, propane, and freons, are preferred. Drying using a pressurizing agent is the preferred method for producing organic aerogels.

EXAMPLE I

Figure 3:
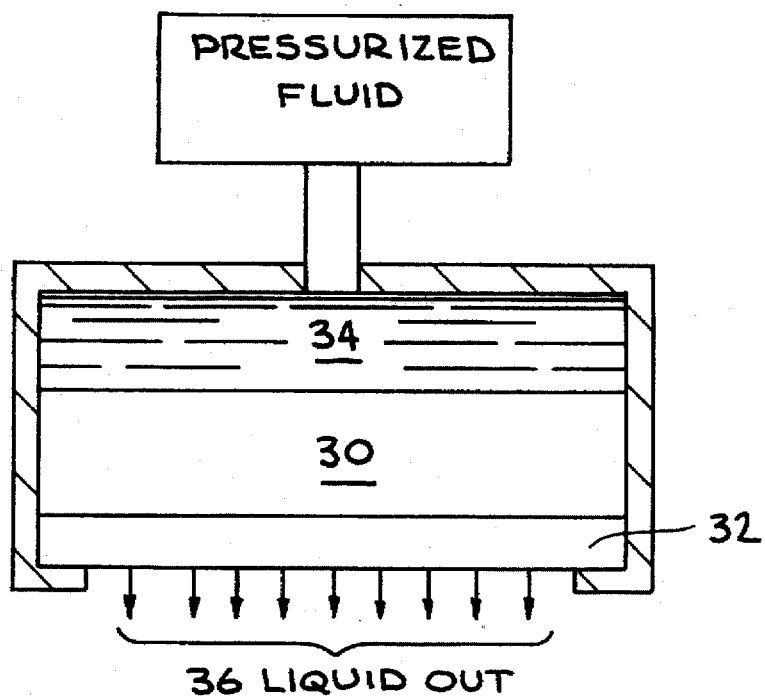
FIG. 3 illustrates the drying process using a pressurized fluid.

FIG. 3 illustrates the drying process by applying a pressurized fluid. The sample 30 to be dried is placed over a highly porous support 32 that has sufficient strength to withstand large pressures. The opposite side of the sample is pressurized by a gas, liquid, or supercritical fluid 34 to a pressure that maximizes the flow of liquid 36 from the porous medium 32 without cracking it. The expelled liquid 36 passes through the highly porous support 32 and is removed from the low pressure side by suitable means.

In a preferred configuration, a thin cylindrical gel filled with liquid alcohol is placed between two porous metal plates in a cylindrical pressure vessel. The vessel is heated to a temperature slightly below the boiling point of the alcohol and is pressurized from one side with supercritical carbon dioxide fluid. The liquid alcohol is expelled from the opposite side of the gel cylinder and flows through the porous substrate to be captured in a vented container. When all the alcohol has been purged from the cylinder, compressed dry air is used to purge the supercritical carbon dioxide from the sample. During this process, the supercritical carbon dioxide vaporizes as it leaves the pressure vessel and can either be vented or recondensed for further use.

In a variation of the preferred method, the liquid carbon dioxide is used as the pressurized fluid. But converting it to a supercritical fluid is delayed until the carbon dioxide liquid fully replaces the alcohol in the gel sample. The pressure vessel is then heated sufficiently to convert the liquid carbon dioxide to a supercritical fluid. Air pressure is used to purge the supercritical fluid as described above.

EXAMPLE II

Another embodiment of the invention may be used to produce silica aerogels of any selected density. The precursor solution is made from predetermined amounts of silicon alkoxide (e.g., tetramethoxysilane, tetraethoxysilane), water, and a diluent solvent (e.g., methyl alcohol, ethyl alcohol). The solution is mixed for five minutes and poured into a metal mold. The mold is closed and sealed, and placed into a secondary containment vessel. The vessel is sealed so that it can be evacuated. Additional alcohol may be introduced to fill the void space in any tubing connecting the mold to the external pressure system.

A heating coil around the vessel is energized so that the mold temperature rises at a rapid rate to a maximum temperature of 300° C. This temperature exceeds the critical temperature of the solvent (typically an alcohol) in the gel pores. During this time ($\approx$15 min), the gel forms within the mold, and the internal pressure rises to about 200 bars. At that pressure, gelation is substantially complete. Any excess pressure in the vessel above 200 bars is released through a pressure relief valve into a container.

The temperature is held at 300° C. while the internal pressure is reduced at a controlled rate using a control valve. During this time ($\approx$15 min), the effluent (alcohol) drains into the container at a controlled rate, while the internal pressure drops. When the internal pressure reaches 2 bars, the heaters are shut off, and cooling fluid is passed through the containment vessel surrounding the mold. Compressed air is purged into the mold through connecting tubing. When the mold has cooled to near room temperature, the mold is removed from the secondary pressure vessel and opened, and the aerogel is removed.

The entire process (mixing, gelling, and drying) can be completed in about 90 minutes or less. Silica aerogels having a density of about 10 mg/cc have been produced in less than an hour. The present procedure applies not only to silicon alkoxides, but to any metal alkoxide that can be hydrolyzed by water and condensed to form a gel or a powder.

This method allows aerogels to be formed into any shape for which molds can be made, since the gel assumes whatever volume is filled by the initial liquid mixture. In a second embodiment of the method, silica aerogel powders are formed using the procedure described above, but the pressure within the vessel is limited to 100 bars by the pressure relief valve. In this case, the particles (sols) are formed, but gelation is not completed before supercritical conditions are achieved in the vessel.

The foregoing description of preferred embodiments of the invention is presented for purposes of illustration and description and is not intended to be exhaustive or to limit the invention to the precise form disclosed. Many modifications and variations are possible in light of the above teaching.

We claim:

1. A process for rapidly producing open-pore microporous or mesoporous materials, comprising:

heating a gel precursor solution or a pre-formed gel while confining its physical expansion by providing a sealed vessel having interior walls with the gel or gel precursor substantially filling the vessel's entire internal volume, controllably releasing internal pressure from the vessel.

2. The process as recited in claim 1, wherein the precursor comprises a metal alkoxide solution.

3. The process as recited in claim 1, wherein the gel precursor forms a gel in situ in the sealed vessel during heating.

4. The process as recited in claim 3, wherein the pre-formed gel or in situ gel expands slightly during heating to form a seal against the internal walls of the sealed vessel.

5. The process as recited in claim 3, wherein the pre-formed gel or in situ gel is selected from the group consisting of alcogels and hydrogels.

6. The process as recited in claim 3, wherein the pre-formed gel or in situ gel contains a liquid in its pores, and further comprising removing the pore liquid to form the microporous or mesoporous material.

7. The process as recited in claim 6, wherein the microporous or mesoporous material is selected from the group consisting of inorganic aerogels, organic aerogels, porous glasses, xerogels, polymer foams, and pre-ceramics.

8. The process as recited in claim 6, wherein removing the pore liquid is carried out by heating the gel to a subcritical point of the pore liquid, applying a pressurized fluid to at least one side of the gel to replace the pore liquid, and removing the pore liquid from the vessel.

9. The process as recited in claim 8, further comprising removing the pressurized fluid from the gel and the vessel to form the porous material.

10. The process as recited in claim 9, further comprising purging with a gas or evacuating the porous material after removing the pressurized fluid.

11. The process as recited in claim 9, wherein the pressurized fluid is a liquid, and removing the pressurized fluid is carried out by heating the liquid to above the supercritical point to form a supercritical fluid, and removing the supercritical fluid from the gel and the vessel to form the porous material.

12. The process as recited in claim 8, wherein the pressurized fluid is selected from the group consisting of gases, liquids, and supercritical fluids.

13. The process as recited in claim 8, wherein the pressurized fluid is selected from the group consisting of carbon dioxide, nitrous oxide, air, helium, propane, and freons.

14. The process as recited in claim 8, wherein the pressurized fluid is a supercritical fluid, and further comprising removing the supercritical fluid from the gel and the vessel to form the porous material.

15. The process as recited in claim 6, wherein the porous material is selected from the group consisting of cracked gels, pellets, monoliths, powders, and granules.

16. The process as recited in claim 6, wherein removing the pore liquid is carried out by heating the gel to above the supercritical point of the pore liquid to form a supercritical fluid, and removing the supercritical fluid from the gel and the vessel to form the porous material.

17. The process as recited in claim 16, wherein the supercritical fluid is selected from the group consisting of water, carbon dioxide, nitrous oxide, propane, freons, alcohols, ketones, ethers, amines, and nitrated hydrocarbons.

18. The process as recited in claim 16, further comprising purging with a gas or evacuating the porous material after removing the supercritical fluid.

19. The process as recited in claim 16, wherein the average rate of removing the supercritical fluid from the vessel exceeds three (3) psi per minute.

20. A process for rapidly producing open-pore microporous or mesoporous materials, comprising:

heating a gel precursor solution or a pre-formed gel while confining its physical expansion by providing a mold of desired dimensions within a sealed vessel, wherein the mold and the gel or gel precursor substantially fill the vessel's entire internal volume, controllably releasing internal pressure from the vessel.

* * * * *